2,843,637
MANUFACTURE OF TETRACHLOROBENZENE

John T. Clarke and Stephen N. Hall, Baton Rouge, La., assignors to Ethyl Corporation, New York, N. Y., a corporation of Delaware No Drawing. Application September 23, 1952
Serial No. 311,155

5 Claims. (Cl. 260—650)

This invention relates to the preparation of chlorinated hydrocarbons and particularly to a method for chlorinating benzene and lower chlorinated benzene compounds to form 1,2,4,5-tetrachlorobenzene.

In the chlorination of benzene, under conditions which give substitution reactions, a product is formed containing a mixture of benzene compounds ranging from monochlorobenzene to hexachlorobenzene. In addition, several of these poly-chlorinated benzene compounds are formed as a plurality of isomers. It is impossible by known means to control the chlorination process to obtain a single compound or a single isomer of any one of these benzene compounds. Thus, in the chlorination of benzene and compounds thereof, such as monochlorobenzene, dichlorobenzene, trichlorobenzene, or mixtures thereof, to produce 1,2,4,5-tetrachlorobenzene, the reaction product obtained by known processes contains not only the desired tetra-isomer but also the other isomers of tetrachlorobenzene, as well as quantities of dichlorobenzenes, trichlorobenzenes, pentachlorobenzene, and hexachlorobenzene.

The recovery of a high purity 1,2,4,5-tetrachlorobenzene in high yields is even more difficult when the feed material itself contains a wide variety of chlorinated benzenes. Such a feed material is commercially available in large quantities at the present time derived from the dehydrochlorination of benzene hexachloride. A typical dehydrochlorination product, while dependent somewhat upon the conditions and catalysts employed in the dehydrohalogenation process, contains about 80 percent, 1,2,4-trichlorobenzene, with the remaining 20 percent made up of at least nine (9) other chlorinated benzene compounds or isomers.

A method for the preparation of tetrachlorobenzene from a relatively pure feed material (orthodichlorobenzene) is disclosed in U. S. Patent No. 1,934,675. In this process, the feed material is chlorinated at temperatures between 20° and 30° C. to obtain partial chlorination of the feed material. The slurry so-formed is then separated to recover 1,2,4,5-tetrachlorobenzene and the mother liquor further chlorinated with additional quantities of fresh feed material. Low temperature operation is necessary in this prior process to obtain reasonable conversions of orthodichlorobenzene to 1,2,4,5-tetrachlorobenzene. This process normally must be carried out in a batch operation, or at best a cyclic batch operation, since it involves the handling of a heterogeneous reaction mass which is not normally suitable for continuous chlorination and recovery of a 1,2,4,5-tetrachlorobenzene product. In addition, conversions based either on chlorine consumption or organic feed consumption are not satisfactory. The recovery of the 1,2,4,5-tetrachlorobenzene crystals from the mother liquor is difficult and the product so-recovered is either of untenably low purity or extremely low yield, or both.

It is accordingly an object of this invention to provide an improved process for the manufacture of 1,2,4,5-tetrachlorobenzene. Another object is to provide a process of the above type which is particularly adapted to utilize a feed material containing a mixture of chlorinated benzene compounds, and which permits the recovery of an essentially pure 1,2,4,5- product in high yields. Still another object is to provide a process which is adapted to continuous operation.

We have discovered that all of the above objectives can be obtained if the degree of chlorination of the organic feed material per pass through the chlorinator is controlled within relatively close limits, and if the lower chlorinated feed materials, trichlorobenzenes and lower chlorinated benzene compounds are separated from the reaction product prior to separation of a 1,2,4,5-tetrachlorobenzene from the high boiling fraction.

According to the present invention, the chlorine feed is controlled relative to the organic feed to control the degree of chlorination of the feed to 1,2,4,5-tetrachlorobenzene. This ratio should be within the general range of 0.1 mole of chlorine/mole of feed trichlorobenzene equivalent to 0.6 mole of chlorine/mole of feed trichlorobenzene equivalent. The term "trichlorobenzene equivalent" means that quantity of pure benzene, monochlorobenzene, dichlorobenzene, or mixtures thereof which is equivalent to trichlorobenzene itself. The mole ratio and range of chlorine/benzene compounds, i. e. benzene, monochlorobenzene, etc. corresponding to trichlorobenzene equivalent is as follows: benzene, 2.8–3.6; monochlorobenzene, 1.9–2.6; dichlorobenzene, 1.0–1.6; and trichlorobenzene, 0.1–0.6. When employing mixed feed stocks, the chlorine ratio can be calculated as a summation of the individual components of the feed material. A preferred mole ratio range of chlorine/trichlorobenzene equivalent is between 0.3–0.4 mole ratio.

More particularly, according to this invention a suitable feed material containing benzene and/or lower polychlorobenzene compounds (monochlorobenzenes, dichlorobenzenes, and trichlorobenzenes) are reacted with chlorine under substitutive chlorination conditions, such as in the presence of iron, ferric chloride, or aluminum chloride, or any other suitable Friedel-Craft type catalyst. The ratio of chlorine/organic feed is controlled, as noted above, and sufficient reaction time is permitted at the operating temperature to obtain essentially complete chlorine conversion. The reaction mixture so-formed is then treated to separate the trichlorobenzene or lower chlorinated fraction of the reactor solution from the higher boiling fraction containing the 1,2,4,5-tetrachlorobenzene. A suitable separation technique involves fractionation of the reactor solution, recovering the bottoms, and further chlorinating the overhead fraction, either in a batch operation or by recycling, in a continuous process, the overhead back to the chlorinator. The bottoms stream is then selectively crystallized, as by cooling the solution, and the crystalline 1,2,4,5-tetrachlorobenzene product is thereafter recovered from the mother liquor. The latter product is recovered, without washing, in a purity consistently above 90 percent and, with washing in an unprecedented purity of above about 98 percent. The yields of the above product are consistently above those attainable with prior known processes.

Separation of the unreacted trichlorobenzene fraction, as by fractionation, from the higher boiling fraction of the reactor solution should be essentially complete for optimum conditions, although some quantities of lower chlorinated compounds may be tolerated in the crystallizer feed material. In general, the concentration of trichlorobenzene and other lower chlorinated benzene compounds should not exceed 20 percent by weight of the crystallizer feed solution, and preferably less than 2–5 percent.

When carrying out the present process on a continuous basis and recycling the unreacted trichlorobenzene, the recycle weight ratio of organic feed/organic recycle should be between 0.5:1 to 10:1, and preferably between 1:1 to 3:1. In general, higher recycle ratios improve both the chlorine and organic feed utilization in producing 1,2,4,5-tetrachlorobenzene. However, recycle ratios above 10:1 do not appreciably improve the feed material economy of the process. Lower recycle ratios can be employed, particularly with pure feed materials, but only at the expense of the economical utilization of chlorine and organic feed.

The temperature of the chlorination step can vary between 10°–150° C. although a temperature between 75°–85° C. is preferred. In general, higher temperatures merely increase the reaction rate of the process. Lower temperatures of chlorination can also be employed, but generally it is desired, in a continuation process, to maintain the temperature sufficiently high to prevent crystallization within the chlorinator.

The temperature of crystallization of the 1,2,4,5-tetrachlorobenzene should be between 15°–60° C., depending upon the final solidification temperature of the crystallizer solution. In general, it is preferred to employ a crystallizer temperature between 20°–35° C.

The following examples illustrate the degree of control in the purity and yield of 1,2,4,5-tetrachlorobenzene product which can be obtained by virtue of the novel features of this invention, i. e. (1) by the use of partial chlorination per pass of the organic feed through the chlorinator and (2) by separation of the low boiling fraction from the high boiling fraction of the reactor solution prior to crystallization of the 1,2,4,5-tetrachlorobenzene product.

EXAMPLE I

Benzene feed material was fed to a chlorinator at the rate of 425 parts by weight/hour along with 55 parts by weight of chlorine/hour. Essentially complete conversion of the chlorine was obtained. The reactor product was then crystallized at 44° C. (In this example, the 1,2,4,5-tetrachlorobenzene was crystallized directly from the reactor solution.) The average crystallization residence time was 120 minutes. Table I gives the composition of the feed material and the crude reactor product. The recovery of 1,2,4,5-tetrachlorobenzene was 31.2 percent. The purity of the product was 88.5 percent.

*Table I*

| Compound | Feed | Crude Reactor Product, Wt. Percent |
|---|---|---|
| 1,2-dichlorobenzene | 0.6 | |
| 1,3-dichlorobenzene | 1.5 | |
| 1,4-dichlorobenzene | 1.4 | |
| 1,2,3-trichlorobenzene | 4.7 | 3.1 |
| 1,2,4-trichlorobenzene | 75.6 | 62.2 |
| 1,3,5-trichlorobenzene | 8.4 | |
| 1,2,3,4-tetrachlorobenzene | 0.9 | 11.3 |
| 1,2,3,5-tetrachlorobenzene | 1.8 | 7.8 |
| 1,2,4,5-tetrachlorobenzene | 2.6 | 14.3 |
| Pentachlorobenzene | | 0.8 |
| Hexachlorobenzene | | 0.5 |
| Pentachlorocyclohexene | 2.5 | |

EXAMPLE II

Example I was repeated except that the lower boiling fraction was removed from the reactor product prior to crystallization. In order to get a comparable recovery, the crystallization temperature was maintained at 80° C. In this example, a product of considerably higher purity was obtained—98 percent purity with a 36.9 percent recovery. The composition of the reactor stream and the stripped tetrachlorobenzene crystallizer feed is given in Table II.

*Table II*

| Compound | Crude Reactor Product, Wt. percent | Column Bottoms (After stripping off trichlorobenzene and lower fraction), Wt. percent |
|---|---|---|
| 1,2,3-trichlorobenzene | 3.1 | 1.4 |
| 1,2,4-trichlorobenzene | 62.2 | 3.0 |
| 1,2,3,4-tetrachlorobenzene | 11.3 | 30.2 |
| 1,2,3,5-tetrachlorobenzene | 7.8 | 14.1 |
| 1,2,4,5-tetrachlorobenzene | 14.3 | 43.7 |
| Pentachlorobenzene | 0.8 | 7.0 |
| Hexachlorobenzene | 0.5 | 0.6 |

EXAMPLE III

Example I was repeated except that the crystallizer temperature was lowered to increase the recovery of the 1,2,4,5-tetrachlorobenzene product. In this example, a product was obtained having 68.9 percent purity in 70.2 percent yield.

EXAMPLE IV

Example III was repeated except that the lower boiling fraction was removed from the crude reactor product prior to crystallization of the 1,2,4,5-product. Also the crystallizer temperature was maintained at 50° C. so as to obtain corresponding yields of the desired 1,2,4,5-tetrachlorobenzene. In this example a 96.9 percent pure product was obtained in 72.4 percent yields of Example III.

The following examples are given to demonstrate the improved product and recovery obtainable by stripping the trichlorobenzene and lower chlorinated benzenes prior to crystallization of the 1,2,4,5-tetrachlorobenzene product in contrast to stripping after crystallization.

EXAMPLE V

A benzene feed material (181.6 parts by weight) having a feed composition given in Table III was reacted in the presence of powdered iron with 38 parts by weight of chlorine. The residence time in the chlorinator was about 200 minutes. The average temperature of the reaction was 65° C. The chlorinated reactor product was thereafter crystallized directly, i. e. in the presence of unreacted trichlorobenzene and other lower chlorinated benzenes. In this example, an 81 percent pure 1,2,4,5-tetrachlorobenzene product was obtained in 94 percent recovery. The chlorinator feed compositions are given in Table III.

*Table III*

| Compound | Feed material | Reactor composition |
|---|---|---|
| 1,2-dichlorobenzene | .6 | |
| 1,3-dichlorobenzene | 1.7 | |
| 1,4-dichlorobenzene | 1.3 | |
| 1,2,3-trichlorobenzene | 4.5 | |
| 1,2,4-trichlorobenzene | 76.9 | 14.9 |
| 1,3,5-trichlorobenzene | 9.5 | |
| 1,2,3,4-tetrachlorobenzene | 1.1 | 17.7 |
| 1,2,3,5-tetrachlorobenzene | 1.7 | 2.4 |
| 1,2,4,5-tetrachlorobenzene | 2.6 | 36.3 |
| Pentachlorobenzene | 0.1 | 23.4 |
| Hexachlorobenzene | | 5.3 |

EXAMPLE VI

Example V was repeated except that the trichlorobenzene and lower chlorinated benzenes were stripped from the reactor product prior to crystallization of the 1,2,4,5-tetrachlorobenzene product. The product obtained had a 94 percent purity and was recovered in 94 percent yield based on the product in the reactor solution.

The following example demonstrates the undesirability of recycling to the chlorinator the mother liquor of the crystallizer containing undesired tetrachlorobenzenes and higher chlorinated derivatives.

EXAMPLE VII

Example V was repeated except that the mother liquor from the crystallizer was recycled to the chlorinator along with a constant amount of fresh chlorine and organic feed. This process was carried through three cycles. In the second cycle, a 1,2,4,5-tetrachlorobenzene product having 64 percent purity was obtained in 85 percent recovery. In the third cycle, both the purity and recovery were further reduced, the product being obtained in 60 percent purity and 76 percent recovery.

The following examples illustrate a continuous process carried out in accordance with the present invention.

EXAMPLE VIII

A benzene feed material containing substantial quantities of 1,2,4-trichlorobenzene was chlorinated at 80° C. in a one-stage pot-type continuous reactor in the presence of iron nails. The fresh benzene material was fed to the chlorinator at the rate of 350 parts by weight/hour and the chlorine was concurrently fed at a rate of 125 parts by weight/hour. The average residence time in the chlorinator was 87 minutes. The reaction product was continuously fractionated at an overhead temperature of 215° C., the overhead being recycled to the chlorinator along with the fresh feed, and the bottoms being passed into a stirred crystallizer maintained at 50° C. The so-formed 1,2,4,5-tetrachlorobenzene crystalline product was separated by centrifugation from the mother liquor, using 1100 gravities.

The composition of the various process streams are given in Table IV. The overall 1,2,4,5-tetrachlorobenzene product purity, before washing, was 93 percent, and the overall yield was 62 percent based on feed 1,2,4-trichlorobenzene or equivalent. After washing with methanol, the product purity was 99 percent.

EXAMPLE IX

Example VIII was repeated, except that the fresh benzene feed material was fed at a rate of 346 parts by weight/hour, the chlorine feed rate was 123 parts by weight/hour, the overhead temperature was 216° C., and the crystallizer temperature was 40° C.

The composition of the various process streams are given in Table V. The overall 1,2,4,5-tetrachlorobenzene product purity, before washing, was 93.2 percent and the overall yield was 59 percent, based on 1,2,4-trichlorobenzene or its equivalent. After washing with methanol, the product purity was 99 percent.

*Table IV*

| Compound | Feed | Reactor product | Crystallizer feed | Recycle | Product | Mother liquor |
|---|---|---|---|---|---|---|
| 1,2-dichlorobenzene | 0.6 | | | 0.1 | | |
| 1,3-dichlorobenzene | 1.7 | | | 0.1 | | |
| 1,4-dichlorobenzene | 1.5 | | | 1.0 | | |
| 1,2,3-trichlorobenzene | 5.0 | 0.1 | 0.1 | 2.0 | | 0.3 |
| 1,2,4-trichlorobenzene | 77.8 | 65.8 | 0.4 | 95.0 | 0.1 | 2.1 |
| 1,3,5-trichlorobenzene | 7.9 | 0.1 | | 0.1 | | |
| 1,2,3,4-tetrachlorobenzene | 0.6 | 11.0 | 31.8 | | 4.5 | 69.3 |
| 1,2,3,5-tetrachlorobenzene | 1.9 | 3.0 | 6.9 | 0.1 | 1.4 | 11.6 |
| 1,2,4,5-tetrachlorobenzene | 2.8 | 20.0 | 56.1 | 1.6 | 93.0 | 6.0 |
| Pentachlorobenzene | | | 4.6 | | 1.0 | 10.4 |
| Hexachlorobenzene | | | 0.2 | | | 0.3 |

*Table V*

| Compound | Feed | Reactor product | Crystallizer feed | Recycle | 1,2,4,5-product | Mother liquor |
|---|---|---|---|---|---|---|
| 1,2-dichlorobenzene | 1.6 | | | 0.3 | | |
| 1,3-dichlorobenzene | 1.0 | | | | | |
| 1,4-dichlorobenzene | 1.2 | | | 0.6 | | |
| 1,2,3-trichlorobenzene | 7.0 | 1.6 | | 2.5 | | |
| 1,2,4-trichlorobenzene | 83.2 | 67.6 | 0.1 | 92.0 | | |
| 1,3,5-trichlorobenzene | 1.0 | | | | | |
| 1,2,3,4-tetrachlorobenzene | 1.7 | 11.1 | 37.1 | 0.5 | 5.6 | 83.4 |
| 1,2,3,5-tetrachlorobenzene | 0.7 | 0.7 | 2.5 | 0.1 | 1.1 | 3.1 |
| 1,2,4,5-tetrachlorobenzene | 2.6 | 18.3 | 58.0 | 4.0 | 93.2 | 7.5 |
| Pentachlorobenzene | | 0.7 | 2.3 | | 0.1 | 6.0 |
| Hexachlorobenzene | | | | | | |

EXAMPLE X

Example IX was repeated except that the crystallizer temperature was maintained at 50° C. The composition of the various process streams are given in Table VI. The overall 1,2,4,5-tetrachlorobenzene product purity, before washing, was 94.6 percent and the overall yield was 58 percent based on feed 1,2,4-trichlorobenzene or its equivalent. After washing with methanol, the product purity was 99 percent.

*Table VI*

| Compound | Crystallizer feed | Mother liquor |
|---|---|---|
| 1,2,3,4-tetrachlorobenzene | 4.3 | 81.5 |
| 1,2,3,5-tetrachlorobenzene | 1.1 | 0.8 |
| 1,2,4,5-tetrachlorobenzene | 94.6 | 12.1 |
| Pentachlorobenzene | | 5.6 |

When a pure benzene feed is employed, or other mixtures of benzene and/or chlorinated benzenes, similar results are obtained, except that the proportions of the impurities change to some extent. Also similar results are obtained when the chlorination is carried out at temperatures between 10° and 150° C., although longer chlorination residence times are necessary at lower temperatures.

Comparable results are obtained when the recycle ratio of the organic light fraction to fresh organic feed is varied between 0.5:1 and 10:1. In general, high recycle ratios tend to reduce the degree of over-chlorination of the feed material and lower recycle ratios tend to increase the quantities of pentachlorobenzene and hexachlorobenzene in the product.

When lower crystallization temperatures are employed in the above examples, the yield of the 1,2,4,5-tetrachlorobenzene increases, but only at the expense of the product purity. In general, it is preferred to crystallize at a temperature somewhat above the final solidification temperature of the higher boiling fraction of the reactor solution.

It is believed apparent from the foregoing that the present invention provides an improved process for the manufacture of 1,2,4,5-tetrachlorobenzene from a benzene feed material whereby exceptional yields and purities of the desired isomer may be obtained. The process, while useful for treating pure benzene, is particularly suitable for chlorinating mixtures of lower chlorinated benzenes, such as are obtained in the dehydrochlorination of benzene hexachloride. The present novel process can be readily and conveniently carried out in a continuous process. The combined steps of controlling the degree of chlorination of the organic feed material and the separation of the lower from the higher boiling fractions of the reactor product permit optimum organic feed and chlorine economy, in addition to permitting higher recoveries and product purities than heretofore possible.

We claim:
1. The process which comprises chlorinating a mix- ture consisting essentially of 1,2,3-trichlorobenzene and 1,2,4-trichlorobenzene at a temperature of about 100° to 150° C. to produce a mixture comprising 1,2,4-trichlorobenzene and isomers of tetrachlorobenzene, fractionally distilling the mixture to separate overhead a fraction substantially enriched in 1,2,4-trichlorobenzene and to leave a fraction consisting essentially of a mixture of 1,2,3,4-tetrachlorobenzene and 1,2,4,5-tetrachlorobenzene, cooling said mixture to a temperature below about 50° C. to crystallize the 1,2,4,5-tetrachlorobenzene and separating the latter.

2. The process which comprises chlorinating a mixture consisting essentially of 1,2,3-trichlorobenzene and 1,2,4-trichlorobenzene at a temperature of about 10° to 150° C. to produce a mixture comprising 1,2,4-trichlorobenzene and isomers of tetrachlorobenzene, fractionally distilling the mixture to separate the overhead fraction substantially enriched in 1,2,4-trichlorobenzene and to leave a fraction consisting essentially of a mixture of 1,2,3,4-tetrachlorobenzene and 1,2,4,5-tetrachlorobenzene, cooling said mixture to a temperature below about 60° C. to crystallize the 1,2,4,5-tetrachlorobenzene and separating the latter.

3. The process of claim 2 wherein the chlorine and trichlorobenzene are reacted in a mole ratio of from 0.1:1.0 to 0.6:1.0.

4. The process of claim 2 wherein the overhead fraction is recycled for further chlorination.

5. The process of claim 4 wherein the recycle weight ratio of said overhead fraction to fresh feed is between 0.5:1 and 10:1.

References Cited in the file of this patent

UNITED STATES PATENTS

| | | |
|---|---|---|
| 1,934,675 | Mills | Nov. 7, 1933 |
| 2,690,458 | Clarke et al. | Sept. 28, 1954 |

FOREIGN PATENTS

| | | |
|---|---|---|
| 655,686 | Great Britain | Aug. 1, 1951 |

Notice of Adverse Decision in Interference

In Interference No. 92,688 involving Patent No. 2,843,637, J. T. Clarke and S. N. Hall, MANUFACTURE OF TETRACHLOROBENZENE, final judgment adverse to the patentees was rendered May 11, 1965, as to claims 1 and 2.

[*Official Gazette September 28, 1965.*]